Oct. 30, 1945. W. GIGER 2,387,896
ELECTRO-MECHANICAL CONTROL SYSTEM FOR VEHICLES
Filed Nov. 29, 1943
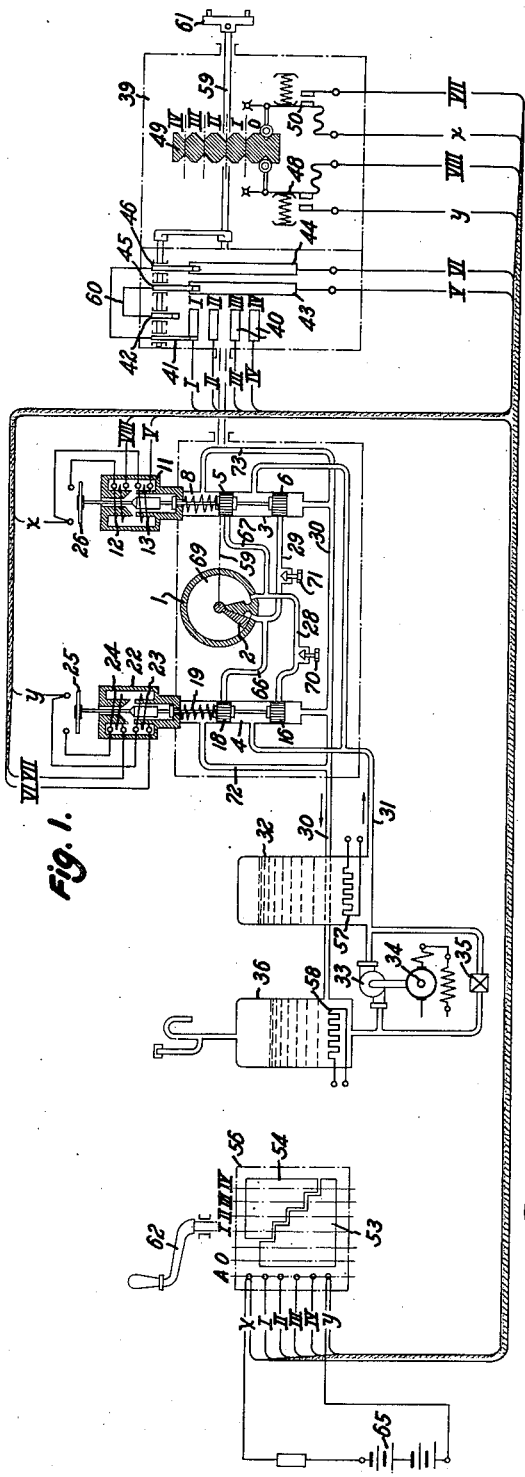

Patented Oct. 30, 1945

2,387,896

UNITED STATES PATENT OFFICE 2,387,896

ELECTROMECHANICAL CONTROL SYSTEM FOR VEHICLES

Walter Giger, Zurich, Switzerland, assignor to Aktiengesellschaft Brown, Boveri & Cie, Baden, Switzerland Application November 29, 1943, Serial No. 512,264
In Switzerland November 9, 1942

9 Claims. (Cl. 121—41)

Electro-mechanical control systems for electric and thermal-electric vehicles are known where apparatus for regulating the speed of the vehicle, for instance the main switch drums, or for adjusting the speed of the thermal driving machines by means of one or several switch motors, is remote controlled from the driving cab either by purely electrical or electro-pneumatic means. Other service switches, such as for instance combination switches for direct current vehicles, reversing controllers, recuperation switches and the like, are also generally operated in this way. Compressed air control systems have the disadvantage that they generally operate comparatively irregularly and are very greatly affected by the ambient temperature. Purely electrical control systems on the other hand require heavy magnetic or electrical drives if larger forces have to be produced and such apparatus must also be provided with auxiliary devices such as locking levers, pawls, brakes and the like, if definite control positions have to be adhered in an accurate manner.

Conditions are much simpler if according to the invention in order to produce the required movement a non-compressible fluid is used to actuate the electrically remote controlled switch motor. The accuracy of the control is then already assured by the system itself.

The use of such a fluid is especially suitable in connection with thermal-electric vehicles because these are generally already equipped with pressure oil systems for lubricating and controlling the thermal machines. The new method of control can, however, also be used for alternating or direct current vehicles.

Two constructional examples of the invention are illustrated in the accompanying drawing. Fig. 1 is a schematic diagram of a control system for a thermal-electric locomotive, Figs. 2 and 3 are diagrammatic views illustrating the pressure oil motor and associated control valves in different positions of adjustment, and Fig. 4 is a fragmentary diagrammatic view of another form of oil motor and control valve system. The complete system of connections is only shown in Fig. 1 where for the sake of simplicity in addition to the "off" position only four operating positions are shown. The device can, however, of course be used for a larger number of operating positions.

Oil pump 33 which is driven by electric motor 34 draws oil from the tank 36 and delivers it to the pressure tank 32 and the oil pipe 31 which is connected with both control valves 3 and 4. These valves regulate the supply of fluid to the reversible pressure oil motor 1 according to the electrical impulses which are delivered to the valve magnets 11 and 22 from the manually operated controller 56. The motor 1 operates the main drive shaft 59 that has a coupling member 61 for connection to a control apparatus, not shown.

In order to prevent the fluid pressure in pressure tank 32 and pipe 31 from becoming too high, a safety valve 35 is provided which allows the fluid to flow back from tank 32 to tank 36 where there is atmospheric pressure. A position indicating drum 39 is connected to the main control shaft 59 of the pressure oil motor 1. By means of the manually operated controller 56 and the position indicating drum 39 it is thus possible to rotate the main control shaft 59 continuously or by stages either in the switching-on or switching-off sense. The arrangement shown in the drawing is also suitable for the multiple control of vehicles.

In Fig. 1 the control apparatus is shown in the "off" position. Step by step switching-up occurs as follows after the pump motor 34 has been started and there is therefore pressure oil in tank 32.

Controller handle 62 is for instance moved into running position I. A control current flows from the positive pole of the auxiliary battery 65 over surface 54 of controller drum 56 through conductor I to surface 40/I of drum 39, over brush 41, then over brush 46, slip ring 44 and through conductor VI to coil 23 of magnet 22 and then over conductor y connected to surface 53 of drum 56 back to the negative pole of battery 65. Coil 23 now raises both control pistons 16 and 18 of valve 4 against the pressure of spring 19, so that piston 18 admits pressure oil through pipe 66 to space 68 of the pressure oil motor 1, as shown in Fig. 2. By lifting control valve 4 piston 16 allows the pressure oil in space 69 to discharge through pipe 28 and flow back to oil tank 36 through pipe 30. By means of a throttle screw 70 or similar device the switching-up velocity of vane 2 can be regulated. Vane 2 of motor 1 thus rotates in a clockwise direction until valve 18 interrupts the supply of pressure oil. When switching up from the "off" position to position I brush 41 of drum 39 leaves contact 40/I and thus interrupts the circuit to coil 23 of control valve 22. The apparatus must, however, switch further until position I is reached. For this purpose a cam disc 49 is arranged on drum 39 which upon reaching each position opens switches 48 and 50. As soon as the main shaft 59 began to revolve, switch 50 was closed. A circuit is thus formed which runs from the positive pole of battery 65 over conductor x, switch 50 and conductor VII to the auxiliary coil 24 of control valve 22, then to valve contact 25 which is now also closed and over conductor y to the negative pole of the battery. During the time taken by brush 41 to leave surface 40/I and thus interrupt the current to coil 23, switch 50 keeps the auxiliary coil 24 excited and therefore control valve 4 open until the exact position I is reached, where the circuit of auxiliary coil 24 is interrupted at switch 50 and valve 4 under the influence of spring 19 falls back into the position shown. Coil 23 is now no longer excited because brush 41 in the position II is now connected through surface 40/II with conductor II, that is to say the coil is connected at both ends to the negative pole of the battery. The supply of pressure oil to space 68 is thus interrupted. Since both spaces 68 and 69 of motor I are therefore filled with oil, vane 2 is held exactly in the position into which it has been moved. When the controller handle 62 is rotated still further the same process repeats itself until the new position is reached.

The operation of moving back towards the "off" position occurs in an analogous manner. The controller handle 62 is for instance moved back from position IV to position III. This causes conductor IV to come in contact with the negative surface 53 of drum 56 whilst the other conductors I, II and III are still connected with the positive surface 54. A current now flows from brush 42, which rests on segment 40/IV, over conductor 60 to brush 45, slip ring 43 and conductor V to coil 13 of the valve magnet 11 and then over conductor x to the positive pole of battery 65. Magnet 11 by means of piston 5 therefore releases the supply of pressure oil through pipe 67 to space 69 in oil pressure motor 1. Simultaneously, as Fig. 3 shows, piston 6 releases the oil from space 68 through pipe 29, whereupon the oil flows back through pipes 29 and 30 to tank 36. Valve 2 is only moved in a counter-clockwise direction until valve 3 interrupts the supply of oil to and from motor 1. Due to the backward rotation of shaft 59 brush 42 has left contact IV and coil 13 is therefore no longer excited. In the meantime cam switch 48 has, however, been closed and a current flows from conductor y(—) through conductor VIII to the auxiliary coil 12 of valve magnet 11 over the valve contact 26 to the positive conductor x. Valve 3 is still kept open until the cam switch 48 also interrupts this circuit after the exact position III has been reached. Coil 13 no longer excites itself in this position because brush 42 now rests on surface 40/III, which still has a positive potential from the controller 56, and because the other end of this coil is also connected with x, that is with the positive pole of battery 65. Due to the action of spring 8 the valve pistons 5 and 6 return to the position shown in Fig. 1. The gradual or continuous return movement of shaft 59 occurs in an analogous manner until the "off" position is reached. A throttle screw 71 or similar device enables the return switching speed to be adjusted. This can be selected so as to be different from the advancing switching speed which is adjusted by means of the throttle screw 70.

In order to ensure that the system also operates perfectly at low temperatures it is an advantage to employ oil for the pressure fluid because its viscosity varies very slightly with the temperature. To increase the safety of operation both tanks 32 and 36 can advantageously be equipped with heating devices 57 and 58 respectively which are generally only switched on shortly before the vehicle has to be started at low temperatures and especially when it is standing in the open in the winter. Oil pipes 72 and 73 serve to return any leakage oil to the tank 36.

Fig. 4 shows a modified form of the invention with only a single control valve 9 for the pressure oil motor 1. The electrical valve magnets 22 and 11 are the same as those shown in Figs. 1-3 and the electrical control of valve 9 is achieved in the same manner as with the arrangement already described.

If for instance coil 23 is excited, piston 20 admits the pressure oil from the pipe 31 to the pressure oil motor 1. At the same time piston 21 allows the oil to flow from space 69 to the oil pipe 30 which leads to tank 36. Vane 2 thus rotates in a clockwise direction. The exact position of each operating stage is also here attained with the second coil 24 and by means of contact 25.

If coil 13 of valve 11 is according to Fig. 4 excited, the valve is pulled to the right. Piston 21 now allows oil to enter space 69 in the pressure oil motor 1. At the same time piston 20 has, however, opened the discharge of oil from space 68 so that valve 2 now moves in a counter-clockwise direction. Also in this case vane 2 reaches exactly each desired operating position with the aid of coil 12 and contact 26.

Other constructional examples of the invention are of course possible. The pressure oil motor 1 with the oscillating vane 2 can be replaced by a reciprocating piston or the solenoid magnets (11, 22) with their reciprocating armatures can be replaced by rotating magnets. Mushroom valves or butterfly valves can be used instead of the piston valves (5, 6, 16, 18, 20, 21). Controller drums 56 and 39 can also be of other construction. The control system can be automatic or semiautomatic.

Since there is generally a supply of compressed air on vehicles of this kind the hydraulic valves can be controlled by means of compressed air, if necessary electro-pneumatically, instead of directly by means of electromagnets, so that the hydraulic valves are thus provided with an electro-pneumatic pre-control.

With alternating-current locomotives having an oil-insulated transformer the pressure oil can be supplied by the oil circulating pump of the transformer, whilst with thermal-electric vehicles a pressure oil pump has to be provided for the lubricating oil and regulating system so that this pump can be so dimensioned that it can also supply the control oil for the electrical regulating system.

As already mentioned the pressure fluid can also be used for controlling combination switches for the purpose of connecting the driving motors in series-parallel, regulating the speed and power of the prime movers, operating the brakes, and the like. If desired each of these control systems can be provided with its own special pressure oil motor.

I claim:

1. In a control system for electrical, thermal and electro-thermal vehicles, the combination with a reversible fluid motor having a shaft for connection to a control device, a pressure source of non-compressible fluid, a return flow tank, and valve means for controlling the flow of pressure fluid from said pressure source to said motor and the exhaust of fluid from said motor to said return flow tank, of electrical means for actuating said valve means; said electrical means comprising a pair of electromagnetic operators for alternative energization to actuate said valve means to admit pressure fluid to said motor to operate the same in opposite directions, each electromagnetic operator having an operating coil and a holding coil, a control drum switch and an indicating drum switch on said motor shaft, energizing circuits for said operating coils including in series step contact on said drum switches, and energizing circuits for said holding coils including holding switches and step-by-step actuating means for the same operable by said motor shaft, said indicating drum switch opening the step contacts thereof after initial movement of the motor shaft to close said holding switches.

2. In a control system, the invention as recited in claim 1 wherein the energizing circuit of each holding coil includes a normally open switch operable to closed position on energization of the associated operating coil.

3. In a control system, the invention as recited in claim 1 in combination with adjustable means for controlling the operating speed of said motor.

4. In a control system, the invention as recited in claim 1 in combination with means individually adjustable to control, independently of each other, the operating speeds of the motor in opposite directions.

5. In a control system, the invention as recited in claim 1 wherein said valve means includes a pair of valves independently operable by the respective electromagnetic operators to control operation of said fluid motor in opposite directions.

6. In a control system, the invention as recited in claim 1 wherein said valve means includes a pair of independently operable valve assemblies, in combination with a pressure fluid supply pipe and an exhaust fluid pipe between each valve assembly and said motor.

7. In a control system, the invention as recited in claim 1 wherein said valve means includes a pair of independently operable valve assemblies, in combination with a pressure fluid supply pipe and an exhaust fluid pipe between each valve assembly and said motor, and adjustable means for independently regulating the rates of fluid flow through the respective valve assemblies to control the operating speeds in opposite directions of said motor.

8. In a control system, the invention as recited in claim 1 wherein said valve means comprises a single valve assembly operable in opposite directions by said electromagnetic operators.

9. In a control system for electrical, thermal and electro-thermal vehicles, the combination with a reversible fluid motor having a shaft for connection to a control device, a pressure source of non-compressible fluid, a return flow tank, and valve means for controlling the flow of pressure fluid from said pressure source to said motor and the exhaust of fluid from said motor to said return flow tank, of electrical means for actuating said valve means; said electrical means comprising a pair of electromagnetic operators for alternative energization to actuate said valve means to admit pressure fluid to said motor to operate the same in opposite directions, each electromagnetic operator having an operating coil and a holding coil, a source of current, a control drum switch operable step-by-step, an indicating drum switch operable by said motor shaft, each of said drum switches having a series of successively engageable contacts corresponding to the several adjustment steps to be imparted to said motor shaft, circuit connections from said current source to said operating coils through corresponding step contacts of said drum switches in series, the step contacts of the indicating drum switch being opened after an initial movement of the motor shaft in response to pressure fluid flow on the energization of an operating coil of one of said electromagnetic operators, holding switches for each of said holding coils, and operating means actuated by said motor shaft for actuating said holding switches to complete a circuit to the holding coil of the energized operating coil prior to the opening of the step contacts of the indicating drum switch and for opening said holding switch upon the movement of said motor shaft into a predetermined step position.

WALTER GIGER.